United States Patent
Kondo (10) Patent No.: US 7,554,901 B2
(45) Date of Patent: *Jun. 30, 2009

(54) DOUBLE SIDED OPTICAL DISC AND METHOD FOR PRODUCING THE SAME

(75) Inventor: Shinya Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/072,277

(22) Filed: Feb. 25, 2008

(65) Prior Publication Data

US 2008/0151732 A1   Jun. 26, 2008

Related U.S. Application Data

(63) Continuation of application No. 10/876,214, filed on Jun. 24, 2004, now Pat. No. 7,376,069.

(30) Foreign Application Priority Data

Jun. 24, 2003   (JP)   ............................. 2003-180024

(51) Int. Cl.
   *G11B 7/24*   (2006.01)
(52) U.S. Cl. ..................... 369/275.3; 369/283; 428/64.4
(58) Field of Classification Search ... 369/275.1–275.4, 369/112.24, 94, 13.39, 283, 52.1, 112.01, 369/13.55, 44.23, 13.31, 280; 428/64.4, 428/64.1, 836; 720/718
See application file for complete search history.

(56) References Cited

U.S. PATENT DOCUMENTS

| 5,716,761 | A | 2/1998 | Iida et al. |
| 5,824,385 | A | 10/1998 | Itoigawa et al. |
| 6,172,945 | B1 | 1/2001 | Hatam-Tabrizi |
| 6,243,350 | B1 * | 6/2001 | Knight et al. ................ 369/126 |
| 6,405,071 | B1 | 6/2002 | Analoui |
| 6,982,127 | B2 * | 1/2006 | Kondo et al. ................. 428/836 |
| 2006/0028970 | A1 * | 2/2006 | Kondo et al. .............. 369/275.1 |

FOREIGN PATENT DOCUMENTS

JP   09-274738   10/1997

* cited by examiner

*Primary Examiner*—Ali Neyzari
(74) *Attorney, Agent, or Firm*—Wolf, Greenfield & Sacks, P.C.

(57) ABSTRACT

A double sided optical disc includes a first record carrier having a light transmitting base board, a first reflecting layer formed on the base board and a first protective layer formed on the first reflecting layer; and a second record carrier having a light transmitting cover, a second reflecting layer formed on the cover and a second protective layer formed on the second reflecting layer. The first record carrier is united to the second record carrier through an adhesive layer for uniting the first protective layer to the second protective layer. The total thickness of the first record carrier and the second record carrier that are united together is not longer than 1.4 mm and the thickness of the light transmitting base board of the first record carrier is not shorter than 1.1 mm. Thus, recording surfaces having different specifications are provided on respective surfaces to improve a utility.

6 Claims, 5 Drawing Sheets

DOUBLE SIDED OPTICAL DISC AND METHOD FOR PRODUCING THE SAME

CROSS REFERENCES TO RELATED APPLICATIONS

The present invention is a Continuation of U.S. application Ser. No. 10/876,214, filed Jun. 24, 2004, which, in turn, claims priority under 35 U.S.C. § 119 to Japanese Patent Application No. JP 2003-180024, filed in the Japanese Patent Office on Jun. 24, 2003, the entire contents of which being incorporated herein by reference.

BACKGROUND OF THE INVENTION

1. Field of the Invention

The present invention relates to a double sided optical disc and a method for producing the double sided optical disc in which a first record carrier is united to a second record carrier so that each surface can be used as a signal recording surface and can be optically recorded and reproduced.

This application claims priority of Japanese Patent Application No. 2003-180024, filed on Jun. 24, 2003, the entirety of which is incorporated by reference herein.

2. Description of the Related Art

As an optical disc for recording and reproducing information by irradiating the optical disc with a laser beam, various kinds of media such as a read-only type compact disc (CD-DA, CD-ROM), a write-once type compact disc (CD-R), a rewritable type compact disc (CD-RW), etc. may be exemplified. Each of the discs is made of a base board having a diameter of 120 mm and the thickness of about 1.2 mm and is designed to be recorded and reproduced by a laser beam of substantially 780 nm.

Further, as the optical disc, there is a digital versatile disc (DVD) as well as the compact disc. In this DVD, one moving picture can be stored in the disc having the same diameter of 120 mm as that of the compact disc with an image quality similar to that of a present television. The DVD needs to increase a storage capacity to six to eight times as high as that of the compact disc. Thus, the DVD records and reproduces data by using a laser beam having the wavelength of 635 to 650 nm shorter than the laser beam used for the compact disc or the like. While the compact disc is made of a single board, the DVD is formed by bonding base boards of 0.6 mm together. A read-only type DVD includes two types of DVDs. As disclosed in Japanese Patent Application Laid-Open No. hei 8-235641, one of them is a DVD that two base boards having recording surfaces are bonded together to use both the surfaces as signal recording surfaces. The other of them is a DVD that a base board having a signal recording surface is bonded to a dummy base board having no signal recording surface to use single surface as a signal recording surface.

Further, as the optical disc having a diameter of 120 mm like the compact disc or the DVD, what is called a Blu-ray disc in which one moving picture can be stored with an image quality the same as that of a high definition television is proposed. This Blu-ray Disc has three types of storage capacity of 23.3 Gbytes, 25 Gbytes and 27 Gbytes. The Blu-ray Disc uses a laser beam having the wavelength of 405 nm further shorter than that of the DVD. Further, the Blu-ray Disc has a structure that a recording layer and a reflecting layer are laminated on a disc board having the thickness of 1.1 mm and a transparent cover layer of 0.1 mm is provided on an uppermost layer to assure a tilt margin.

Further, in the optical disc having both the surfaces used as the signal recording surfaces like the above-described DVD, a printing layer for writing information related to the optical disc cannot be provided on the uppermost layer of each surface. Thus, a DVD that a printing layer is provided adjacently to a protective layer of each base board is disclosed in Japanese Patent Application Laid-Open No. hei 9-274738.

As described above, a plurality of kinds of optical discs such as the compact discs, the DVDs, the Blu-ray Discs, etc. are present in a mixed and confused manner. These optical discs respectively have different specifications, so that they cannot be recorded and reproduced by a common recording and reproducing device. That is, a reproducing device for reproducing the DVD or contents data cannot reproduce the Blu-ray Disc. A reproducing device for the Blu-ray Disc cannot reproduce the compact disc or the DVD.

SUMMARY OF THE INVENTION

The present invention is proposed to solve the above-described problem and it is an object of the present invention to provide a double sided optical disc and a method for producing a double sided optical disc in which recording surfaces having different specifications are respectively provided on surfaces to improve a utility.

It is another object of the present invention to provide a double sided optical disc and a method for producing a double sided optical disc in which when signal recording surfaces are provided on both surfaces, a printing layer is provided in an inner layer so that a user can visually recognize the contents of a record to improve a maneuverability.

In order to achieve the above-described objects, a double sided optical disc according to the present invention comprises: a first record carrier having a light transmitting base board, a first reflecting layer formed on this base board and a first protective layer formed on the first reflecting layer; and a second record carrier having a light transmitting cover, a second reflecting layer formed on this cover and a second protective layer formed on the second reflecting layer. The first record carrier is united to the second record carrier through an adhesive layer by which the first protective layer is united to the second protective layer. In the double sided optical disc, the total thickness of the first record carrier and the second record carrier that are united together is not longer than 1.4 mm and the thickness of the light transmitting base board of the first record carrier is not shorter than 1.1 mm.

In the double sided optical disc, a first printing layer is formed on one surface of the first protective layer and the first reflecting layer has a high reflectance only for a laser beam having a first specific wavelength in the first record carrier. A second printing layer is formed on one surface of the second protective layer and the second reflecting layer has a high reflectance only for a laser beam having a second specific wavelength in the second record carrier so that the printing layers of the inner layers may be externally visually recognized.

A method for producing the above-described double sided optical disc comprises: a step of forming a first record carrier by forming a light transmitting base board having the thickness of 1.1 mm or more, forming a first reflecting layer on the base board and forming a first protective layer on the first reflecting layer; a step of forming a second record carrier by forming a light transmitting cover, forming a second reflecting layer on the cover and forming a second protective layer on the second reflecting layer; and a step of uniting the first protective layer of the first record carrier to the second protective layer of the second record carrier through an adhesive layer to have a total thickness of 1.4 mm or less.

For instance, when both the first record carrier and the second record carrier are record carriers for read-only type, the same content data is recorded on the first record carrier and the second record carrier. At this time, the total quantity of data of the content data recorded on the second record carrier is larger than the content data recorded on the first record carrier. For instance, image data having a standard image quality is recorded on the first record carrier and image data of an HD (high definition) image quality is recorded on the second record carrier. Further, the data with a low compressibility is recorded on the first record carrier and the data with a high compressibility is recorded on the second record carrier.

DETAILED DESCRIPTION OF THE PREFERRED EMBODIMENTS

Figure 1:
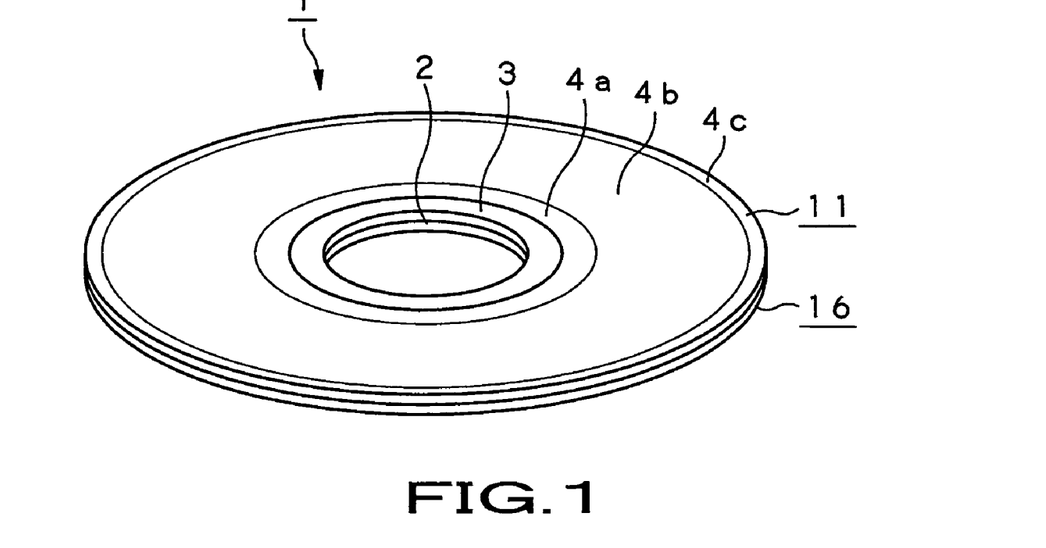
FIG. 1 is a perspective view of a double sided optical disc to which the present invention is applied.

Now, a double sided optical disc to which the present invention is applied will be described by referring to the accompanying drawings. As shown in FIG. 1, in the double sided optical disc 1 described herein, a recording surface corresponding to a compact disc standard is provided on one surface. On the other surface, a recording surface corresponding to a Blu-ray Disc standard is provided. As shown in FIG. 1, in the double sided optical disc 1, a center hole 2 is formed in a central part. In the periphery of the center hole 2, a clamp part 3 is formed. Further, on each surface of the double sided optical disc 1, a lead-in area 4a in which TOC data or the like is recorded, a program area 4b in which a program is recorded and a lead-out area 4c showing the end of the program area 4b are sequentially formed from an inner periphery to an outer periphery as signal recording areas in the outer peripheral side of the clamp part 3.

Figure 2:
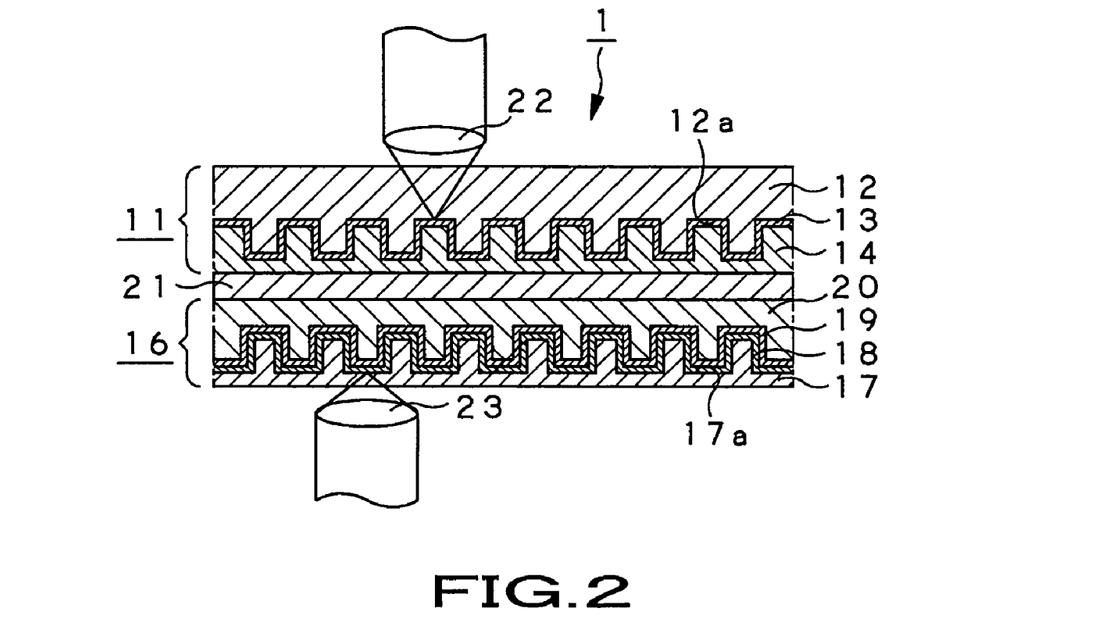
FIG. 2 is a sectional view of main parts the double sided optical disc shown in FIG. 1.

Now, the structure of layers of the double sided optical disc 1 will be described. As shown in FIG. 2, the double sided optical disc 1 is formed in such a way that a first record carrier 11 on which data is recorded on the basis of the compact disc standard is bonded to a second record carrier 16 on which data is recorded on the basis of the Blu-ray Disc standard through an adhesive layer 21.

Here, the first record carrier 11 on which the data is recorded on the basis of the compact disc standard is a record carrier for read-only type. On one surface of the first record carrier 11, a pit pattern 12a corresponding to data to be recorded is formed so as to have a standard recording density. On the other surface, a disc base board 12 as a surface on which a laser beam is incident, a first reflecting layer 13 formed on the pit pattern 12a and a first protective layer 14 formed on the first reflecting layer 13 are provided.

The disc base board 12 is a base board made of a light transmitting synthetic resin such as a polycarbonate resin, etc. and is formed by an injection molding process. As the material of the disc base board 12, resins such as polymethyl methacrylate, acryl resins, epoxy resins, ABS resins or glass may be used as well as the polycarbonate resin. On the one surface of the disc base board 12, the irregular pit pattern 12a corresponding to the data to be recorded is formed. The pit pattern 12a is formed by transferring the irregular pattern of a master stamper disposed in a die upon injection molding. The disc base board 12 is formed to have the thickness of 1.1 mm to 1.4 mm and to preferably have the thickness of 1.2 mm. The total thickness is set to 1.1 mm to 1.5 mm under the compact disc standard. Thus, the lower limit of the thickness of the disc base board 12 used herein is set to 1.1 mm in accordance with the compact disc standard. The total thickness of the Blu-ray Disc is prescribed not to exceed 1.4 mm in accordance with a below-described Blu-ray Disc standard. Since the thickness of a cover layer is substantially 0.1 mm, the upper limit of the thickness of the disc base board 12 is set to 1.4 mm by subtracting 0.1 mm from the total thickness.

The first reflecting layer 13 is a film formed on the pit pattern 12a for reflecting the laser beam incident from the disc base board 12 side. The thickness of the film is such a thickness as to satisfy a reflectance prescribed by the compact disc standard. For instance, the thickness of the film is 0.02 μm to 0.5 μm. The first reflecting layer 13 is formed with Al, Ag or alloy including Ag as a main component. The reflecting layer is not especially limited to these elements. Further, the composition ratio of Ag in the alloy is not especially limited to a specific value. The first reflecting layer 13 can be formed by a film forming method such as a vacuum deposition method, a sputtering method and an ion plating method or the like.

The first protective layer 14 formed on the first reflecting layer 13 serves to protect the first reflecting layer 13. The first protective layer 14 is formed on the first reflecting layer 13 so as to have the thickness of 0.1 μm to 100 μm and preferably have the thickness of 2 μm to 20 μm. As the first protective layer 14, an ultraviolet curing resin (for instance, an ultraviolet curing acrylic resin, an ultraviolet curing epoxy resin), an organic material such as a silicone hard coat resin, an inorganic material such as SiO, SiN, AlN, etc. may be employed. The first protective layer 14 may be formed by an ordinary method such as a spin coating method, a gravure coating method, a spray coating method, a roll coating method, etc.

When the first record carrier 11 is not used as a read-only type and used as a write-once type, a write-once type recording layer made of an organic dye material may be formed on one surface of the disc base board 12 on which a land/groove pattern is formed. The first reflecting layer 13 may be formed on the recording layer. Further, when the first recording carrier 11 is used as a rewritable type, a rewritable recording layer made of a phase change material may be formed on one surface of the disc base board 12 on which the land/groove pattern is formed. The first reflecting layer 13 may be formed on the recording layer.

The second record carrier 16 on which the data is recorded on the basis of the Blu-ray Disc standard is a recording type. An irregular pattern 17a is formed on one surface of the second record carrier 16. On the other surface of the second record carrier 16, a cover 17 as a surface on which the laser beam is incident, a recording layer 18 formed on the irregular pattern 17a of the cover 17, a second reflecting layer 19 formed on the recording layer 18 and a second protective layer 20 formed on the second reflecting layer 19 are provided. On the second record carrier 16, data is recorded with density higher than that of the compact disc or a DVD.

The cover 17 is made of a light transmitting type film, which is a base material when the second record carrier 16 is formed. The cover 17 is formed by, for instance, an injection molding method. On the one surface of the cover 17, an irregular pattern 17a composed of lands/grooves that serves as a controlling pattern for tracking is formed. The cover 17 is formed to have the thickness of 0.1 mm to assure a tilt margin as the inclination of the optical axis of the laser beam. The irregular pattern 17a may be formed by transferring the irregular pattern of a master stamper 32 in accordance with an injection molding method. In addition thereto, the irregular pattern may be formed on one surface of the light transmitting film having the thickness of about 0.1 mm by a printing technique such as a screen printing method, a pad printing method, etc.

The recording layer 18 formed on the irregular pattern 17a is formed to have the thickness of 20 nm to 200 nm by, for instance, a spin coating method. When the recording layer 18 is used as a rewritable type, the recording layer 18 is formed with, for instance, a phase change material. When the recording layer 18 is used as a write-once type, for instance, an organic dye material is used.

As the organic dye materials used for the write-once type recording layer, cyanine dyes, squarylium dyes, croconium dyes, azulenium dyes, triarylamine dyes, anthraquinone dyes, metal-containing azo dyes, dithiol metal complex salt dyes, indoaniline metal complex dyes, phthalocyanine dyes, naphthalocyanine dyes, intermolecular CT complex dyes, etc. are exemplified. The recording layer including a dye according to the present invention may use a single dye or a plurality of dyes of these dyes at the same time. Not only these organic dyes, but also an antioxidant, a quencher such as a dithiol complex, a binder such as nitrocellulose, cellulose acetate, a ketone resin, an acrylic resin, polyvinyl butyral, polycarbonate, polyolefine, etc. may be added. Further, as the phase change material used for the rewritable recording layer, GeSbTe, InSbTe, AgInSb, etc. protected by a dielectric layer may be employed.

The second protective layer 20 is prescribed to have the total thickness that does not exceed 1.4 mm under the Blu-ray Disc standard. That is, in the double sided optical disc 1, all the thickness of the disc needs to fall within the prescribed range. To satisfy this condition, the second protective layer 20 is formed so as to have the thickness smaller than the thickness under the Blu-ray Disc standard. Since other parts of the second protective layer 20 and the second reflecting layer 19 are the same as the first protective layer 14 and the first reflecting layer 13, an explanation thereof is omitted. Further, the second record carrier 16 can be used as a read-only type. At this time, a pit pattern corresponding to data to be recorded may be provided on one surface of the cover 17 and the second reflecting layer 19 and the second protective layer 20 may be sequentially provided on an upper layer thereof.

The first record carrier 11 and the second record carrier 16 formed in such a way as described above are united integrally with the protective layers 14 and 20 opposed to each other by an adhesive layer 21. The adhesive layer 21 also has a function for optically separating the first record carrier 11 from the second record carrier 16. Further, when the first record carrier 11 is united to the second record carrier 16, a total thickness is set to the total thickness that does not exceed 1.4 mm of the Blu-ray Disc prescribed in accordance with the Blu-ray Disc standard.

That is, as for the entire thickness of the disc, this embodiment employs 1.4 mm as a value that is a smaller tolerance of the total thickness of the disc in the compact disc standard and the Blu-ray Disc standard. The second record carrier 16 is formed on the basis of the Blu-ray Disc standard and the thickness thereof is set to substantially 0.1 mm. On the other hand, the first record carrier 11 is formed on the basis of the compact disc standard and the thickness of the disc base board 12 is set to 1.1 mm to 1.3 mm. Therefore, when the thickness of the disc base board 12 is designed to have the thickness that satisfies the above-described conditions, the double sided optical disc satisfying both the compact disc standard and the Blu-ray Disc standard can be formed.

Now, a method for recording and reproducing the double sided optical disc 1 formed as described above will be described below.

When the data recorded on the first record carrier 11 on the basis of the compact disc standard is reproduced, the surface of the disc base board 12 side is opposed to an objective lens 22 of an optical pick-up. The optical pick-up includes a light source for emitting a laser beam having the wavelength of about 780 nm, an objective lens 22 having the number of apertures of 0.45 and a photo-detector for detecting a return laser beam reflected on the first reflecting layer 13, or the like. The optical pick-up converges the laser beam emitted from the light source by the objective lens 22 and detects the return laser beam reflected on the first reflecting layer 13 by the photo-detector to read the data recorded on the first record carrier 11 with a standard recording density. The first record carrier 11 has a recording layer. At that time, when the data is additionally recorded or rewritten, a laser beam with an output higher than that of reproducing is emitted to record the data on the recording layer with a standard recording density.

Further, when the data recorded on the second record carrier 16 on the basis of the Blu-ray Disc standard is reproduced, the surface of the cover 17 side is opposed to an objective lens 23 of an optical pick-up. The optical pick-up includes a light source for emitting a laser beam having the wavelength of about 405 nm, the objective lens 23 having the number of apertures of 0.85 and a photo-detector for detecting the return laser beam reflected on the second reflecting layer 19 or the like. The optical pick-up converges the laser beam emitted from the light source by the objective lens 23 and detects the return laser beam reflected on the second reflecting layer 19 by the photo-detector to read the data recorded on the second record carrier 16 with a high density. When the optical pick-up records the data on the recording layer 18, a laser beam with an output higher than that of reproducing is emitted to record the data on the recording layer 18 with the high density.

Figure 3A:
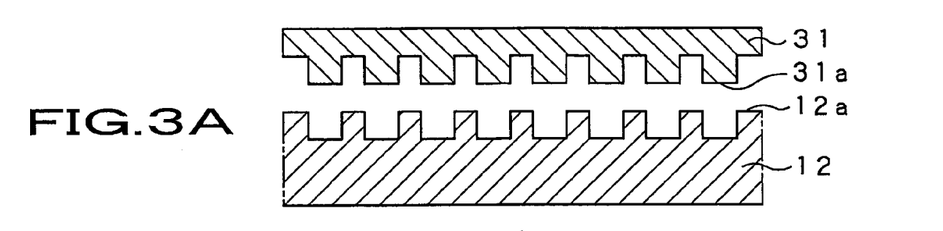
FIGS. 3A to 3C show sectional views of main parts for explaining a method for producing a first record carrier.

Now, a method for producing the double sided optical disc 1 formed as described above will be described by referring to FIGS. 3A to 3C and FIGS. 4A to 4C. Firstly, the disc base board 12 forming the first record carrier 11 is formed in accordance with the injection molding process of a light transmitting synthetic resin such as a polycarbonate resin. Specifically, the disc base board 12 is formed, as shown in FIG. 3A, in such a manner as described below. A master stamper 31 on which an irregular pattern 31a corresponding to data to be recorded is spirally or concentrically formed clockwise or counterclockwise is disposed one of a die having a movable die or a fixed die. A cavity is injected and filled with a resin material. Then, this irregular pattern 31a is transferred to one surface of the disc base board 12.

Now, the master stamper 31 disposed in one of the die for forming a pit pattern 12a on the disc base board 12 will be described. The master stamper 31 is a die on which an irregular form reverse to that of a desired product ((replica); a disc to be mass-produced)) is notched and is made of a nickel (Ni) material or the like. In the master stamper 31, a photoresist is applied on a glass substrate having, for instance, a specular surface. A rotating glass substrate is irradiated with a laser beam whose light modulation such as on and off is made in accordance with data to be recorded thereon. The laser beam is relatively moves and scans in the radial direction of the glass substrate to perform a pattern exposure. Then, this photoresist is developed to form an irregular pattern corresponding to the pattern exposure. The irregular pattern is plated with metal such as silver to form a disc master. The disc master is plated with metal such as nickel to form a metal mask having on its surface an irregular pattern in which the protruding and recessed parts of the above-described disc master are inverted. The irregular pattern of this metal mask is plated with, for instance, nickel to form a mother having an irregular pattern inverted to the irregular pattern of the metal mask. Further, the irregular pattern of the mother is inverted by plating in the same manner as the above-described method.

The disc base board 12 formed by the injection molding method by the use of the die is formed to have the thickness of 1.1 mm to 1.4 mm and preferably to have the thickness of 1.2 mm. Here, the injection molding method is employed so that the thin disc base board 12 can be easily and accurately formed.

Figure 3B:
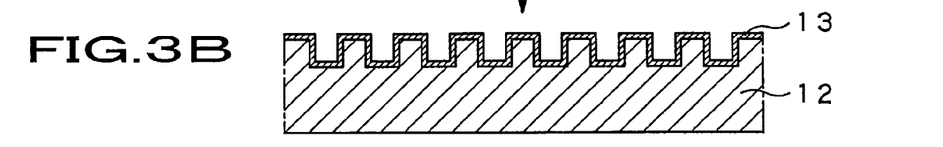

As shown in FIG. 3B, in the disc base board 12 having the irregular pit pattern 12a formed on one surface by the injection molding process, the first reflecting layer 13 made of Al or the like is further formed on the pit pattern 12a to have the thickness of, for instance, 0.02 μm to 0.5 μm. Here, the first reflecting layer 13 is formed by a film forming method such as a vacuum deposition method, a sputtering method and an ion plating, etc.

When the recording layer is formed, after the recording layer is formed on the pit pattern 12a of the disc base board 12, the first reflecting layer 13 is formed.

Figure 3C:
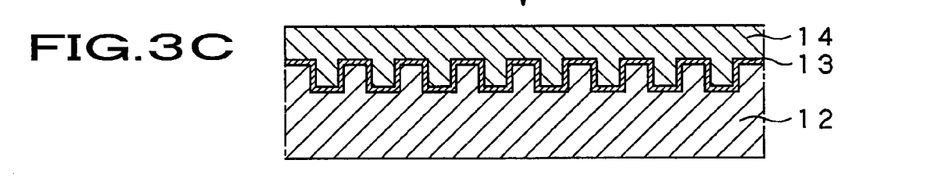

As shown in FIG. 3C, on the first reflecting layer 13, the first protective layer 14 is formed. The first protective layer 14 is formed to have the thickness of 0.1 μm to 100 μm, and preferably to have the thickness of 2 μm to 20 μm by spin-coating a ultraviolet curing resin and irradiating the ultraviolet curing resin with a ultraviolet ray from a ultraviolet ray irradiation apparatus. The first protective layer 14 may be formed by a gravure coating method, a spray coating method, a roll coating method or the like as well as the spin coating method.

Figure 4A:
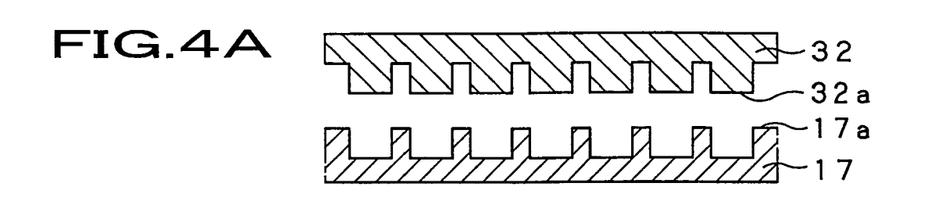
FIGS. 4A to 4C show sectional views of main parts for explaining a method for producing a second record carrier.

Now, a method for producing the second record carrier 16 will be described below. The cover 17 forming the second record carrier 16 is formed, as shown in FIG. 4A, by the injection molding method by the use of a master stamper 32 in the same manner as that of the disc base board 12. Here, the cover 17 is formed to have the thickness of about 0.1 mm. On one surface of the cover 17, an irregular pattern 32a of the master stamper 32 is transferred to form an irregular pattern 17a. Since other points are the same as those of the method for producing the disc base board 12, the detail thereof is omitted.

Figure 4B:
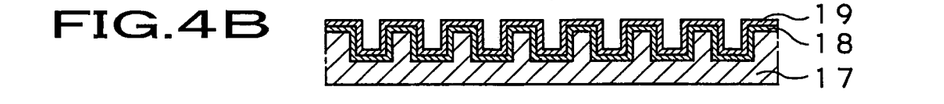

Then, as shown in FIG. 4B, on the irregular pattern 17a of the cover 17, the recording layer 18 is formed and the second reflecting layer 19 is further formed on the recording layer 18. The recording layer 18 is formed to have the thickness of 20 nm to 200 nm by, for instance, the spin coating method. Further, as shown in FIG. 4C, the second protective layer 20 is formed on the second reflecting layer 19.

Figure 4C:
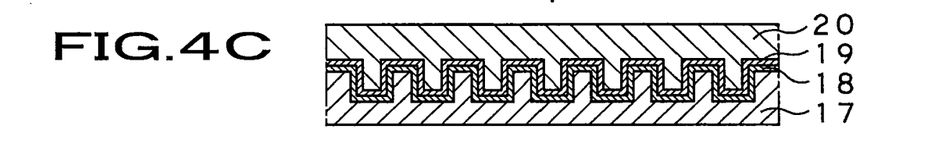

The first record carrier 11 formed as shown in FIGS. 3A to 3C is united to the second record carrier 16 formed as shown in FIGS. 4A to 4C by the adhesive layer 21 so that the first protective layer 14 of the first record carrier 11 is opposed to the second protective layer 20 of the second record carrier 16, as shown in FIG. 2. The adhesive layer 21 is, for instance, a ultraviolet curing adhesive. The adhesive is applied to the protective layer of at least one of the record carriers by a screen printing method to stick the first record carrier 11 to the second record carrier 16. Then, the adhesive is irradiated with the ultraviolet ray so that the record carriers are bonded together.

In the double sided optical disc 1 formed as described above, the first record carrier 11 is stuck to the second record carrier 16. Thus, the data according to the compact disc standard can be recorded on one surface with a standard recording density and the data according to the Blu-ray Disc standard can be recorded on the other surface with a high recording density. Accordingly, in the double sided optical disc 1 of the present invention, data can be recorded and reproduced by any of a recording and reproducing device based on the compact disc standard and a recording and reproducing device based on the Blu-ray Disc standard.

Now, another embodiment of a double sided optical disc to which the present invention is applied will be described by way of FIG. 5. A double sided optical disc 40 shown in FIG. 5 wherein that a printing layer on which information composed of characters, figures or the like respectively related to signal recording surfaces is printed is provided. Specifically, the double sided optical disc 40 includes a first record carrier 41 on which data is recorded on the basis of a compact disc standard, a second record carrier 46 on which data is recorded on the basis of a Blu-ray Disc standard and an adhesive layer 52 by which the first record carrier 41 is stuck to the second record carrier 46.

The first record carrier 41 on which the data is recorded on the basis of the compact disc standard is used as a read-only type. On one surface of the first record carrier 41, a pit pattern 42a corresponding to the data to be recorded is formed so as to have a standard recording density. On the other surface, a disc base board 42 serving as a surface on which a laser beam is incident, a first reflecting layer 43 formed on the pit pattern 42a, a first protective layer 44 formed on the first reflecting layer 43 and a first printing layer 45 formed on the first protective layer 44 are provided.

The first reflecting layer 43 formed on the pit pattern 42a of the disc base board 42 is made of a translucent film having such characteristics as to reflect the laser beam having the wavelength of substantially 780 nm used by the compact disc and transmit other wavelength. Further, the first protective layer 44 formed on the first reflecting layer 43 is a layer made of a light transmitting resin and formed in the same manner as that of the above-described first protective layer 14. The first reflecting layer 43 and the first protective layer 44 are formed to have light transmitting characteristics so that the contents of print of the first printing layer 45 can be visually recognized from the disc base board 42 side.

The first printing layer 45 formed on the first protective layer 44 is formed with ink including dye in a ultraviolet curing resin. For instance, characters or figures or the like are formed thereon by a silk screen printing method. On the first printing layer 45, information related to the data recorded on the first record carrier 41 is displayed. For instance, when audio data is recorded, the image picture of the data, a photograph of an artist and the title of the data are printed. When such a recording layer as described above is formed between the disc base board 42 and the first reflecting layer 43, the first printing layer 45 includes a time during which data can be recorded, a storage capacity, a serial number or the like as the information related to the first record carrier 41.

Since other points of the first record carrier 41 are the same as those of the above-described first record carrier 11, the detail thereof is omitted.

The second record carrier 46 on which the data is recorded on the basis of the Blu-ray Disc standard is a recording type. On one surface of the second record carrier 46, an irregular pattern 47a is formed. On the other surface, a cover 47 serving as a surface on which a laser beam is incident, a recording layer 48 formed on the irregular pattern 47a of the cover 47, a second reflecting layer 49 formed on the recording layer 48, a second protective layer 50 formed on the second reflecting layer 49 and a second printing layer 51 formed on the second protective layer 50 are provided. On the second record carrier 46, the data is recorded with a density higher than that of a compact disc or a DVD.

The second reflecting layer 49 formed on the recording layer 48 is made of a translucent film having such characteristics as to reflect the laser beam having the wavelength of substantially 405 nm used by the Blu-ray Disc standard and transmit other wavelength. The second protective layer 50 formed on the second reflecting layer 49 is a light transmitting resin layer and formed in the same manner as that of the above-described second protective layer 20. The second reflecting layer 49 and the second protective layer 50 are formed to have light transmitting characteristics so that the contents of print of the second printing layer 51 can be visually recognized from the cover 47 side.

The second printing layer 51 formed on the first protective layer 50 is formed with ink including dye in a ultraviolet curing resin. For instance, characters or figures or the like are formed thereon by a silk screen printing method. On the second printing layer 51, a time during which data can be recorded, a storage capacity, a serial number or the like is printed as the information related to the second record carrier 46. When the pit pattern corresponding to the data recorded on one surface of the cover 47 is formed without providing the recording layer 48 so that the second record carrier 46 is used as a read-only type, a title or the like related to the recorded content data is recorded on the second printing layer 51.

The first record carrier 41 and the second record carrier 46 formed in such a way as described above are united integrally with the protective layers 44 and 50 opposed to each other by an adhesive layer 52. The adhesive layer 52 also has a function for optically separating the first record carrier 41 from the second record carrier 46. Further, when the first record carrier 41 is united to the second record carrier 46, a total thickness is set to the total thickness that does not exceed 1.4 mm in the Blu-ray Disc prescribed in accordance with the Blu-ray Disc standard.

Figure 6A:
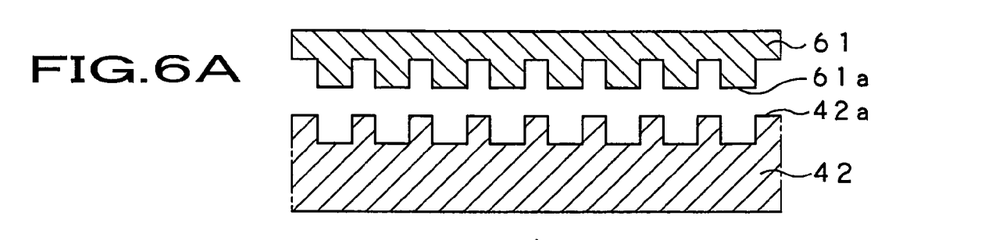
FIGS. 6A to 6D are sectional views of main parts for explaining a method for producing a first record carrier of the double sided optical disc shown in FIG. 5.

Now, a method for producing the double sided optical disc 40 formed as constructed above will be described by referring to FIGS. 6A to 6D and FIGS. 7A to 7D. Firstly, the disc base board 42 forming the first record carrier 41 is formed in accordance with the injection molding process of a light transmitting synthetic resin such as a polycarbonate resin. Specifically, the disc base board 42 is formed, as shown in FIG. 6A, in such a manner as described below. A master stamper 61 on which an irregular pattern 61a corresponding to data to be recorded is spirally or concentrically formed clockwise or counterclockwise is disposed one of a die having a movable die or a fixed die. A cavity is filled with an injected resin material. Then, an irregular pattern 42a is transferred and formed on one surface of the disc base board 42.

Figure 6B:
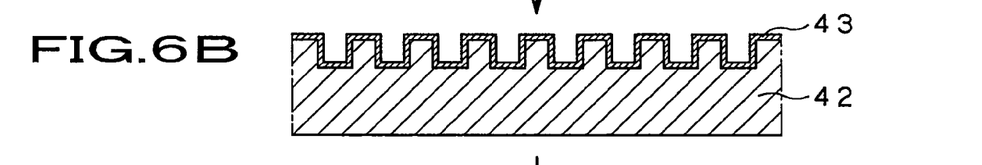
Figure 6C:
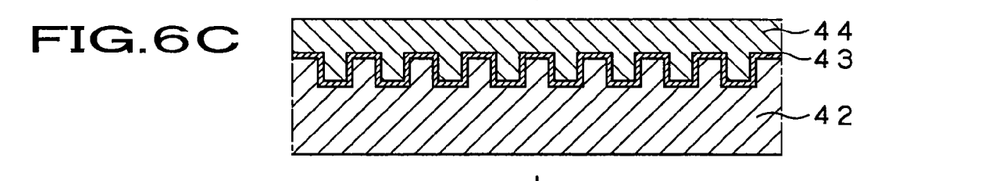

As shown in FIG. 6B, in the disc base board 42 having the irregular pit pattern 42a formed on one surface by the injection molding process, the first reflecting layer 43 made of Al or the like is further formed on the pit pattern 42a. As shown in FIG. 6C, on the first reflecting layer 43, the first protective layer 44 is formed.

Figure 6D:
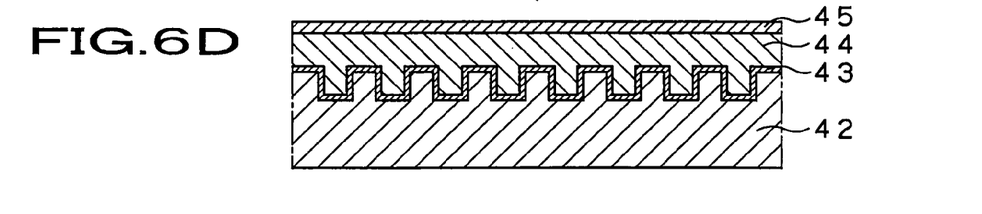

As shown in FIG. 6D, the first printing layer 45 is formed on the first protective layer 44 by a silk screen printing method or the like. The first printing layer 45 is formed in such a way that inks of single color are overlaid and applied to form characters or a picture pattern and the inks of the characters or the picture pattern are irradiated with a ultraviolet ray to cure the inks.

Figure 7A:
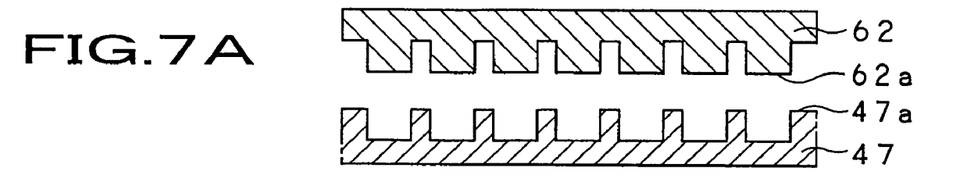
FIGS. 7A to 7D are sectional views of main parts for explaining a method for producing a second record carrier of the double sided optical disc shown in FIG. 5.

Now, a method for producing the second record carrier 46 will be described below. The cover 47 forming the second record carrier 46 is formed, as shown in FIG. 7A, by the injection molding method by the use of a master stamper 62 in the same manner as that of the disc base board 42. Here, on one surface of the cover 47, an irregular pattern 62a of the master stamper 62 is transferred to form an irregular pattern 47a. Since other points are the same as those of the method for producing the disc base board 42, the detail thereof is omitted.

Figure 7B:
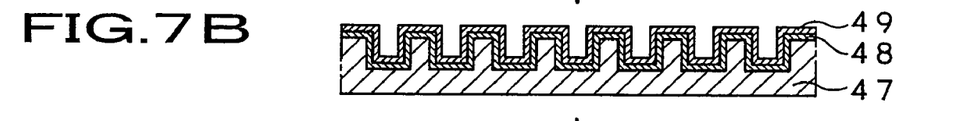
Figure 7C:
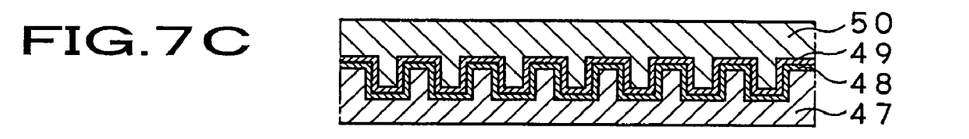
Figure 7D:
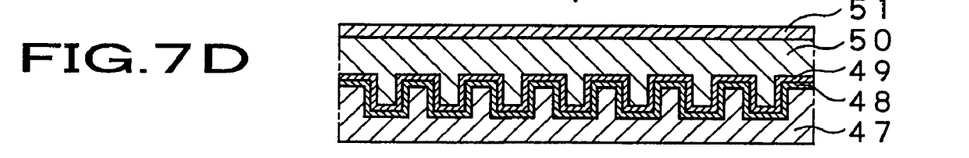

Then, as shown in FIG. 7B, on the irregular pattern 47a of the cover 47, the recording layer 48 is formed and the second reflecting layer 49 is further formed on the recording layer 48. The recording layer 48 is formed by, for instance, a spin coating method. Further, as shown in FIG. 7C, the second protective layer 50 is formed on the second reflecting layer 49. Then, as shown in FIG. 7D, on the second protective layer 50, the second printing layer 51 is formed by the silk screen printing method or the like. The second printing layer 51 is formed in such a way that inks of single color are overlaid and applied to form characters or a picture pattern and the inks of the characters or the picture pattern are irradiated with a ultraviolet ray to cure the inks.

Figure 5:
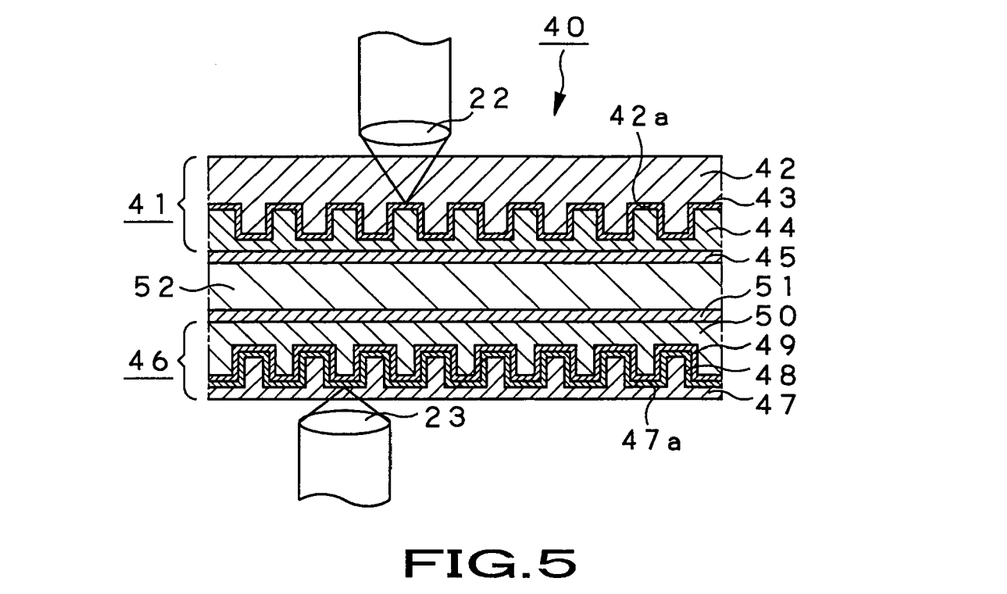
FIG. 5 is a sectional view of main parts for explaining another embodiment of a double sided optical disc to which the present invention is applied.

The first record carrier 41 formed as shown in FIGS. 6A to 6D is united to the second record carrier 46 formed as shown in FIGS. 7A to 7D by the adhesive layer 52 so that the first printing layer 45 of the first record carrier 41 is opposed to the second printing layer 51 of the second record carrier 46, as shown in FIG. 5. The adhesive layer 52 is, for instance, a ultraviolet curing adhesive. The adhesive is applied to the printing layer of at least one of the record carriers by a screen printing method to stick the first record carrier 41 to the second record carrier 46. Then, the adhesive is irradiated with the ultraviolet ray so that the record carriers are bonded together.

In the double sided optical disc 40 formed as described above, the first record carrier 41 is stuck to the second record carrier 46. Thus, the data according to the compact disc standard can be recorded on one surface and the data according to the Blu-ray Disc standard can be recorded on the other surface. Accordingly, in the double sided optical disc 40 of the present invention, data can be recorded and reproduced by any of a recording and reproducing device based on the compact disc standard and a recording and reproducing device based on the Blu-ray Disc standard.

Further, the double sided optical disc 40 is provided with the printing layers 45 and 51 in the inner layers of the first record carrier 41 and the second record carrier 46. The reflecting layers 43 and 49 laminated on the printing layers 45 and 51 are respectively formed so as to reflect the laser beam of the wavelength used in the record carriers and transmit the light of remaining wavelength. Thus, the contents of data written on the printing layers 45 and 51 can be externally visually recognized. For instance, since the contents of the printing layers 45 and 51 are seen so that the recording surfaces can be easily specified. Accordingly, the maneuverability of a user can be improved.

Now, an example of use of the double sided optical discs 1 and 40 to which the present invention is applied will be described below. Here, the first record carriers 11 and 41 and the second record carriers 16 and 46 are both used as a read-only type. On the first record carriers 11 and 41 and the second record carriers 16 and 46, the same content data is recorded. Then, on the first record carriers 11 and 41, the content data such as a moving picture with a standard image quality is recorded. On the other hand, on the second record carriers 16 and 46, the content data with an HD (high definition) image quality is recorded. These content data may be encoded on the basis of a proper system such as an MPEG (Motion Picture Experts Group) 1 or an MPEG 2. For instance, the content data compressed by a compressibility that is higher than the first record carriers 11 and 41 is recorded in the second record carriers 16 and 46 though the compressibility depends on the storage capacity of the first record carriers 11 and 41 and the second record carriers 16 and 46. According to the above-described example, a user who can reproduce both the first record carrier 11 and the second record carrier 16 can output a reproduced image with a desired image quality that meets a display device.

Further, in the above-described example, the content data with the standard image quality is recorded on the first record carriers 11 and 41 and the content data of the HD image quality is recorded on the second record carriers 16 and 46. However, the content data of the HD image quality may be recorded on the first record carriers 11 and 41 and the second record carriers 16 and 46. On the first record carriers 11 and 41, data encoded by an encoding system in which data can be compressed with a high compressibility such as an MPEG4 system or a JVT (Joint Video Team) system may be recorded. On the second record carriers 16 and 46, data encoded by an encoding system such as the MPEG2 system in which data is encoded with a compressibility lower than the compressibility of the MPEG4 system or the JVT system may be recorded. According to the above-described example, a user who can reproduce only one of the record carriers 11 and 41, and the second record carriers 16 and 46 can enjoy the HD image quality.

In the above-described embodiments, the first record carriers 11 and 41 are formed in accordance with the compact disc standard. However, the first record carriers 11 and 41 may be formed in accordance with a DVD standard or other standard.

As described above, according to the present invention, the first record carrier and the second record carrier having the different specifications are united together. Thus, the optical disc on which data can be recorded and reproduced by any of a dedicated recording and/or reproducing device according to respective specifications can be provided.

While the invention has been described in accordance with certain preferred embodiments thereof illustrated in the accompanying drawings and described in the above description in detail, it should be understood by those ordinarily skilled in the art that the invention is not limited to the embodiments, but various modifications, alternative constructions or equivalents can be implemented without departing from the scope and spirit of the present invention as set forth and defined by the appended claims.

What is claimed is:

1. An optical information carrier, comprising:
   a first record layer having recorded thereon information being reproduced by first wavelength laser,
   a second record layer having recorded thereon information being reproduced by second wavelength laser, the second wavelength being no longer than the first wavelength,
   wherein said information recorded on the first recording layer is encoded as standard quality, said information recorded on the second recording layer is encoded as high definition quality.

2. The optical information carrier according to claim 1, wherein said information recorded on said first record layer and said information recorded on said second record layer are originated from a same contents.

3. An optical information carrier, comprising:
   a first record layer having recorded thereon information being reproduced by first wavelength laser,
   a second record layer having recorded thereon information being reproduced by second wavelength laser, the second wavelength being no longer than the first wavelength,
   wherein said information recorded on the first recording layer is high definition quality contents being compressed by first type compression method, said information recorded on the second recording layer is high definition quality contents being compressed by second type compression.

4. The optical information carrier according to claim 3, wherein said first type compression method is capable of compressing information smaller than the second type of compression method.

5. The optical information carrier according to claim 4, wherein said information recorded on said first record layer and said information recorded on said second record layer are originated from a same contents.

6. The optical information carrier according to claim 3, wherein said first record carrier is capable of being reproduced using a laser having wavelength of approximately 780 nm, and said second record carrier is capable of being reproduced using a laser having wavelength of approximately 405 nm.

* * * * *